US007297869B2

(12) United States Patent
Hiller et al.

(10) Patent No.: US 7,297,869 B2
(45) Date of Patent: Nov. 20, 2007

(54) COVERS FOR DISTRIBUTION LINES AND INSULATORS

(75) Inventors: Laura Jackson Hiller, Cary, NC (US); Luis O. Puigcerver, Cary, NC (US); Robert Paul Glembocki, Holly Springs, NC (US); Kenton A. Blue, Fuquay Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 99 days.

(21) Appl. No.: 11/041,534

(22) Filed: Jan. 24, 2005

(65) Prior Publication Data

US 2006/0162953 A1 Jul. 27, 2006

(51) Int. Cl.
*H02G 7/16* (2006.01)

(52) U.S. Cl. ........................ 174/40 R; 174/1; 174/5 R; 174/45 R; 174/138 F; 119/174

(58) Field of Classification Search .................... 174/1, 174/5 R, 40 R, 45 R, 138 F, 138 R, 139; 119/174

See application file for complete search history.

(56) References Cited

U.S. PATENT DOCUMENTS 881,682 A 3/1908 Harrison et al.
983,039 A 1/1911 Field
992,738 A 5/1911 Marshall
1,141,674 A 6/1915 Withers
1,180,729 A 4/1916 Marshall
1,766,636 A 6/1930 Holzel
2,234,391 A 3/1941 Taylor
2,263,319 A * 11/1941 Treanor ...................... 174/5 R
2,617,378 A 11/1952 Osol
2,682,591 A 6/1954 Killian
2,840,631 A * 6/1958 Marcroft ..................... 174/139
2,875,267 A 2/1959 Sutton, Jr.
2,999,479 A 9/1961 Carder
3,005,436 A 10/1961 Caldwell
3,016,034 A 1/1962 Raistakka
3,042,736 A 7/1962 Salisbury
3,056,376 A 10/1962 Bender (Continued)

OTHER PUBLICATIONS

Kysely, Joe, *We Energies Gets a One-Two Punch in Outage Control*, Electric Utility Operations/www/td.world.com/September 2004, 4 pages.

(Continued)

*Primary Examiner*—Dhiru R. Patel
(74) *Attorney, Agent, or Firm*—Myers Bigel Sibley & Sajovec, P.A.

(57) ABSTRACT

A cover for a distribution line conductor includes a cover body defining a channel extending along a lengthwise axis and adapted to receive the conductor. A unitarily formed attachment structure adjoins the cover body. The attachment structure includes first and second jaws positioned adjacent the channel. The first and second jaws are positioned at different locations along a jaw axis parallel to the lengthwise axis and, in a closed position, overlap one another across the jaw axis. The first and second jaws are relatively deflectable from the closed position to an open position to permit passage of the conductor therebetween and into the channel and the first and second jaws can thereafter return toward the closed position to secure the conductor in the channel.

26 Claims, 11 Drawing Sheets

U.S. PATENT DOCUMENTS

| | | | | |
|---|---|---|---|---|
| 3,238,291 | A | | 3/1966 | Bosch et al. |
| 3,270,120 | A | | 8/1966 | Van Name et al. |
| 3,328,511 | A | | 6/1967 | Cagle et al. |
| 3,510,568 | A | | 5/1970 | Cochran |
| 3,639,681 | A | | 2/1972 | Ettlinger |
| 3,692,927 | A | * | 9/1972 | Ellaschuk .................. 174/139 |
| 3,835,238 | A | | 9/1974 | West |
| 3,900,698 | A | | 8/1975 | Yotsugi |
| 4,053,707 | A | | 10/1977 | Ely et al. |
| 4,201,883 | A | | 5/1980 | Shepherd |
| 4,234,753 | A | | 11/1980 | Clutter |
| 4,243,628 | A | | 1/1981 | Herold |
| 4,255,610 | A | | 3/1981 | Textoris |
| 4,280,013 | A | | 7/1981 | Clutter |
| 4,433,630 | A | | 2/1984 | Laborie |
| 4,467,387 | A | | 8/1984 | Bergh et al. |
| 4,628,145 | A | * | 12/1986 | Kolcio et al. ............... 174/5 R |
| 4,731,507 | A | | 3/1988 | Torimoto et al. |
| 4,845,307 | A | | 7/1989 | Cumming et al. |
| 4,906,801 | A | * | 3/1990 | Beasley ...................... 174/5 R |
| 5,023,406 | A | | 6/1991 | Thornley |
| 5,293,835 | A | | 3/1994 | Shagoury |
| 5,650,594 | A | | 7/1997 | Urnovitz |
| 5,682,015 | A | | 10/1997 | Harben |
| 5,794,495 | A | | 8/1998 | Anderson |
| 5,864,096 | A | | 1/1999 | Williams et al. |
| 5,873,324 | A | | 2/1999 | Kaddas et al. |
| 5,994,644 | A | | 11/1999 | Rindoks et al. |
| 6,005,196 | A | | 12/1999 | Spillyards |
| 6,255,597 | B1 | | 7/2001 | Bowling et al. |
| 6,730,852 | B1 | | 5/2004 | Puigcerver et al. |

OTHER PUBLICATIONS

International Search Report and the Written Opinion of the International Searching Authority for PCT Application No. PCT/US2006/001779, dated Jun. 26, 2006.

* cited by examiner

COVERS FOR DISTRIBUTION LINES AND INSULATORS

FIELD OF THE INVENTION

The present invention relates to protective covers and, more particularly, to protective covers for distribution lines and insulators, such as power distribution lines and associated insulators.

BACKGROUND OF THE INVENTION

Support structures, such as utility poles, are often used to suspend electrical lines, such as power distribution lines, above the ground. These support structures are generally located outdoors and may be of a variety of different configurations to suspend one or more lines. One problem with such lines, particularly with power distribution lines that transmit electrical power at high voltages, is that birds or other animals may land or climb onto the lines. Such contact of distribution lines by animals, particularly adjacent the support structure, may cause a short or electrical flash-over allowing current flow through the animal, which may cause a power outage or other problem with the power distribution system.

SUMMARY OF THE INVENTION

According to embodiments of the present invention, a cover for a distribution line conductor includes a cover body defining a channel extending along a lengthwise axis and adapted to receive the conductor. A unitarily formed attachment structure adjoins the cover body. The attachment structure includes first and second jaws positioned adjacent the channel. The first and second jaws are positioned at different locations along a jaw axis parallel to the lengthwise axis and, in a closed position, overlap one another across the jaw axis. The first and second jaws are relatively deflectable from the closed position to an open position to permit passage of the conductor therebetween and into the channel and the first and second jaws can thereafter return toward the closed position to secure the conductor in the channel.

According to further embodiments of the present invention, a cover for an insulator body and a distribution line conductor coupled thereto includes a cover body. The cover body includes a main body portion and a lateral body extension. The main body portion defines a chamber to receive the insulator body. The lateral body extension defines a channel to receive the conductor, and the main body portion and the lateral body extension each open to a receiving side of the cover. A stud bore is defined in the main body portion and is adapted to receive and engage the stud to secure the cover to the insulator body.

According to further embodiments of the present invention, a surge arrestor assembly for use with a distribution line conductor includes a surge arrestor and a cover. The surge arrestor is adapted to operatively couple with the conductor and to redirect electrical current from the conductor in the event of an overvoltage event. The cover is adapted to be mounted on the surge arrestor. The cover includes a cover body including a main body portion and a lateral body extension. The main body portion defines a chamber to receive the surge arrestor. The lateral body extension defines a channel to receive the conductor. The main body portion and the lateral body extension each open to a receiving side of the cover.

According to further embodiments of the present invention, a cover for use with an insulator body includes a cover body defining a channel extending along a lengthwise axis and adapted to receive the insulator body. A unitarily formed attachment structure adjoins the cover body. The attachment structure includes first and second jaws positioned adjacent the channel. The first and second jaws are positioned at different locations along a jaw axis parallel to the lengthwise axis and, in a closed position, overlap one another across the jaw axis. The first and second jaws are relatively deflectable from the closed position to an open position to permit passage of the insulator body therebetween and into the channel and the first and second jaws can thereafter return toward the closed position to secure the insulator body in the channel.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
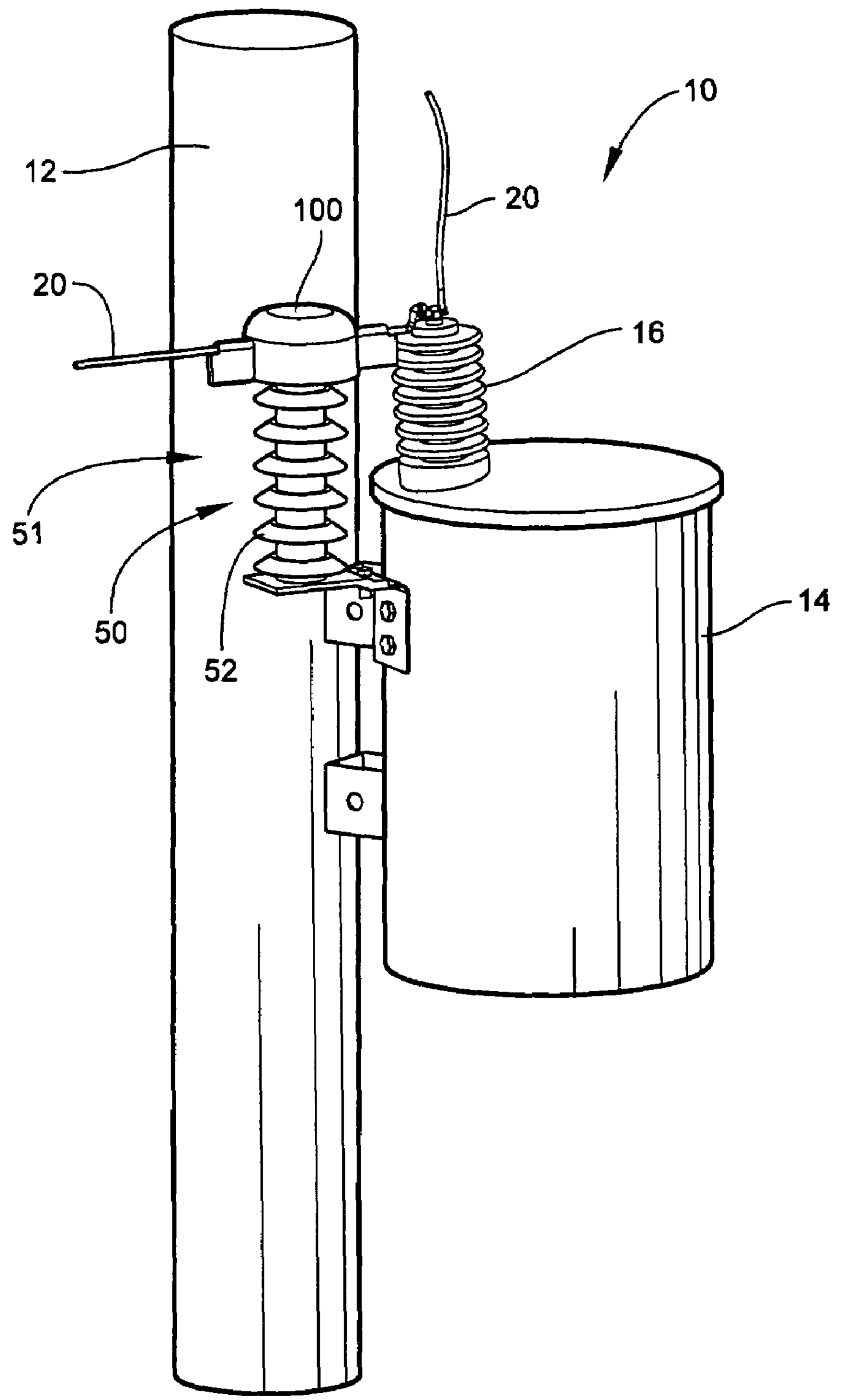
FIG. 1 is a perspective view of a power distribution system including a conductor, a surge arrestor and a protective cover according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIG. 1, a protective cover 100 according to embodiments of the invention is shown mounted on a power distribution system 10. The power distribution system 10 includes a utility pole 12 and a transformer 14 mounted on the pole 12. A bushing 16 extends from the transformer 14. A surge arrestor 50 is mounted on the pole 12 and/or the transformer 14 adjacent the transformer 14. An electrical conductor 20 extends to the arrestor 50, then to the bushing 16, and thereafter to a further component of the system 10. The conductor 20 may be operatively electrically and mechanically connected to the bushing 16 and the arrestor 50 in any suitable manner, such mounting methods being well-known to those of skill in the art.

Figure 2:
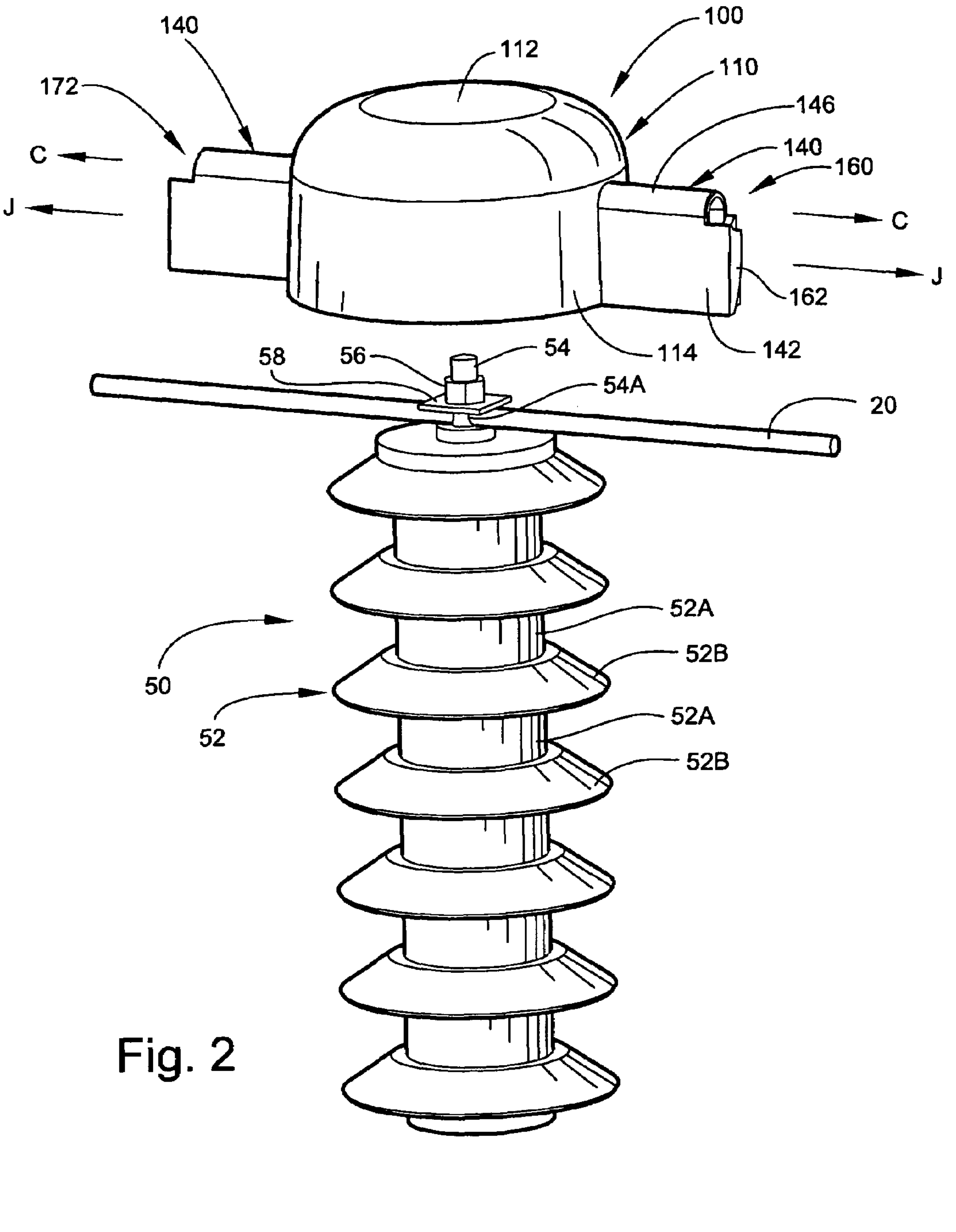
FIG. 2 is an exploded, fragmentary, perspective view of the conductor, the surge arrestor and the cover of FIG. 1.

As best seen in FIG. 2, the arrestor 50 includes an insulator body 52 having alternating core segments 52A and skirts 52B that extend radially outwardly from the core segments 52A. The insulator body 52 may be formed of a polymer or a ceramic, for example. A threaded stud 54 extends longitudinally and generally vertically out of the insulator body 52. The conductor 20 extends through a lateral passage 54A formed in the stud 54 and is secured by a washer 58 and a nut 56. As shown, the conductor 20 is a continuous elongated member or segment extending through the arrestor 50 (and, when installed, the cover 100). Alternatively, the ends of two or more conductors may be connected to the arrestor 50 or the conductor may extend from only one side. Suitable surge arrestor components are housed in the insulator body 52 and are electrically connected to the stud 54 to absorb and/or redirect (e.g., to ground) current (e.g., from a lightning strike) from the conductor 20 to limit or prevent damage to the transformer or other components from an overvoltage event. The surge arrestor components may include, for example, metal oxide varistor blocks or the like with suitable electrical contacts. Suitable surge arrestors will be apparent to those of skill in the art.

Figure 3:
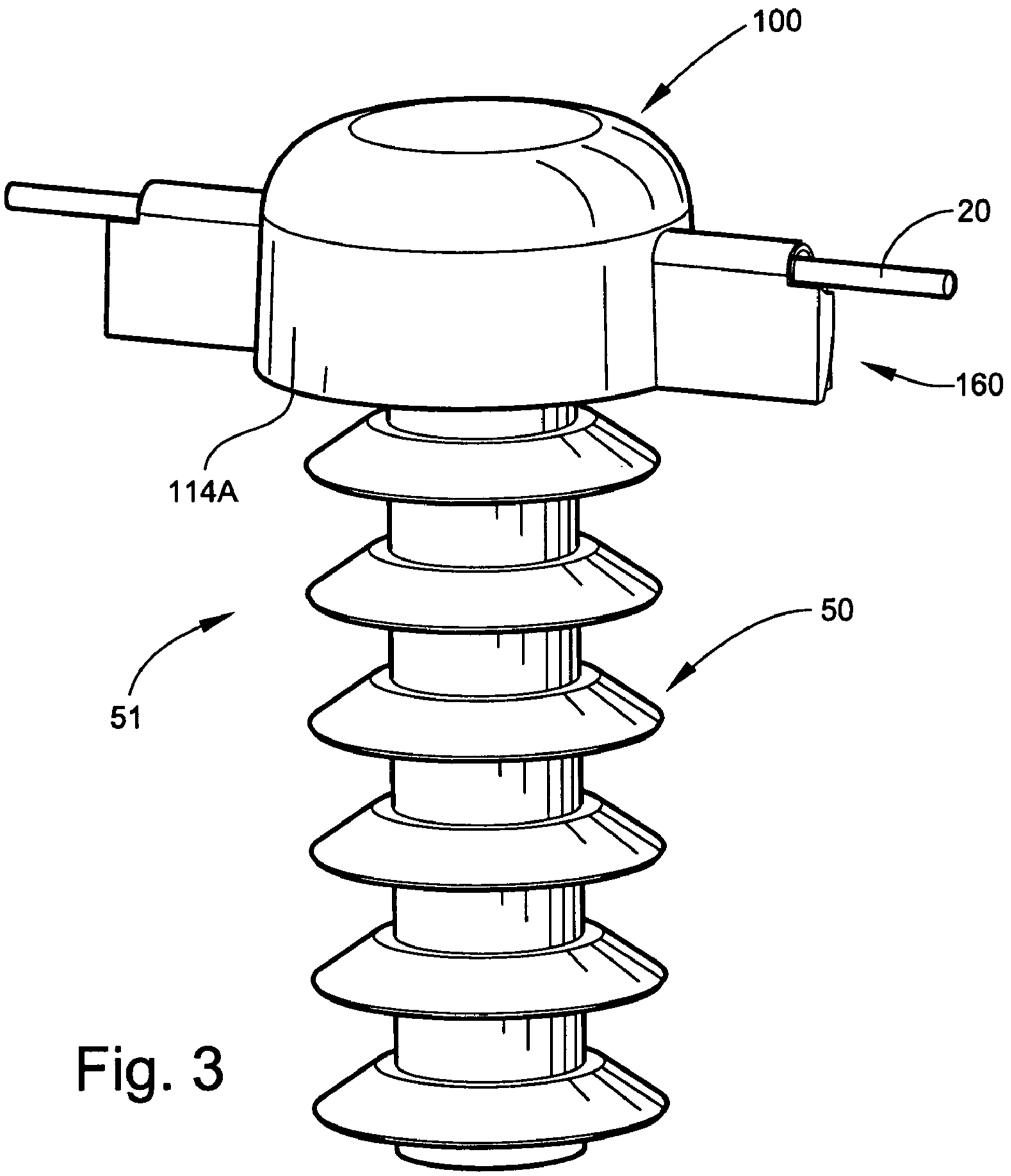
FIG. 3 is a fragmentary, perspective view of the conductor, the surge arrestor and the cover of FIG. 2 with the cover mounted on the surge arrestor and the conductor.
Figure 4:
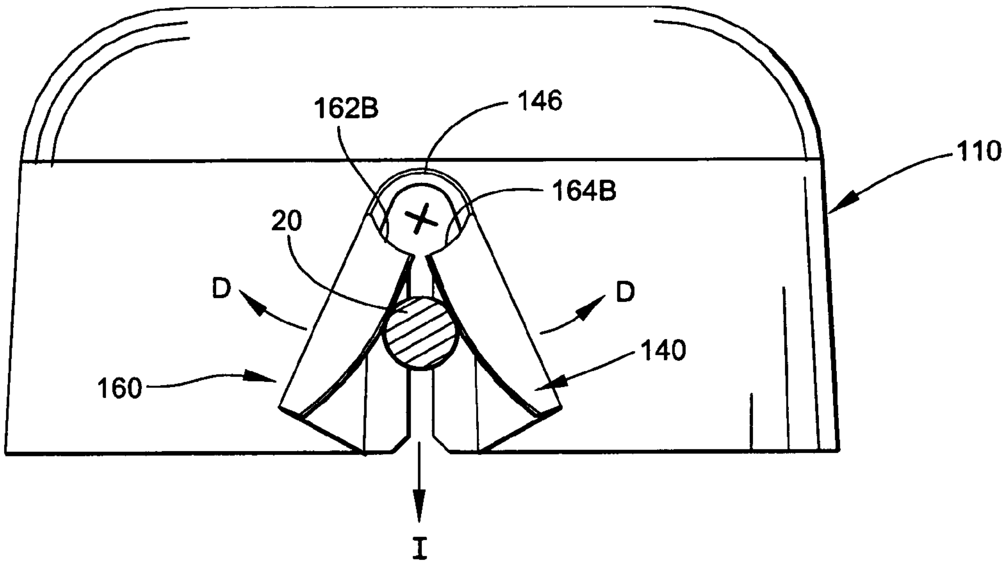
FIG. 4 is an end view of the conductor and the protective cover of FIG. 3 wherein the cover is in an open position.
Figure 5:
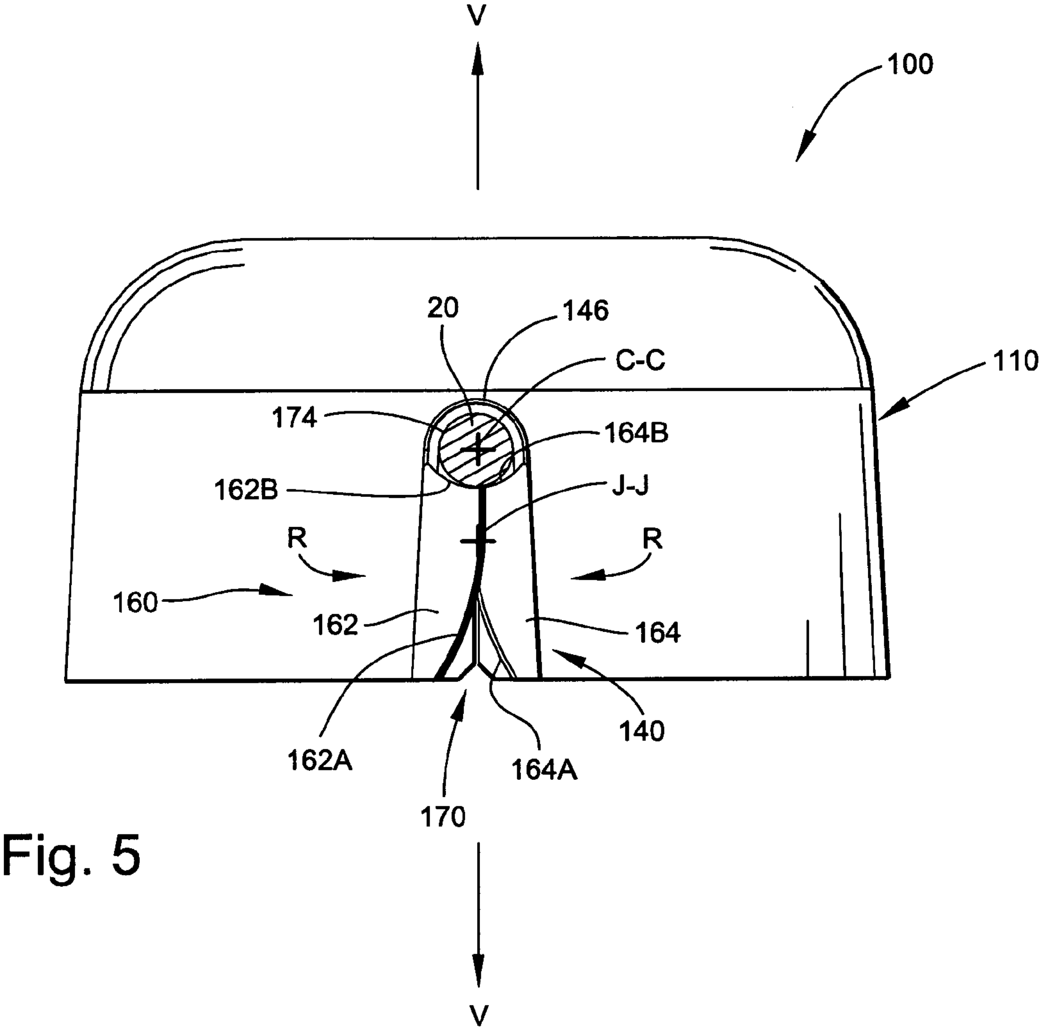
FIG. 5 is an end view of the protective cover of FIG. 3 in a closed position with the conductor mounted therein.

Turning to the protective cover 100 in more detail and as best seen in FIGS. 3-8, the protective cover 100 has a cover body including a main body or shroud portion 110 and a pair of opposed, laterally extending body extensions or arms 140. The protective cover 100 is adapted to receive the arrestor 50 and portions of the conductor 20 such that at least a portion of the conductor 20 generally extends along a lengthwise axis C-C (FIGS. 2 and 5). Generally, the main body 110 provides coverage for the electrically conductive components of the arrestor 50 and portions of the conductor 20, and the arms 140 provide coverage for more extant portions of the conductor 20.

Figure 6:
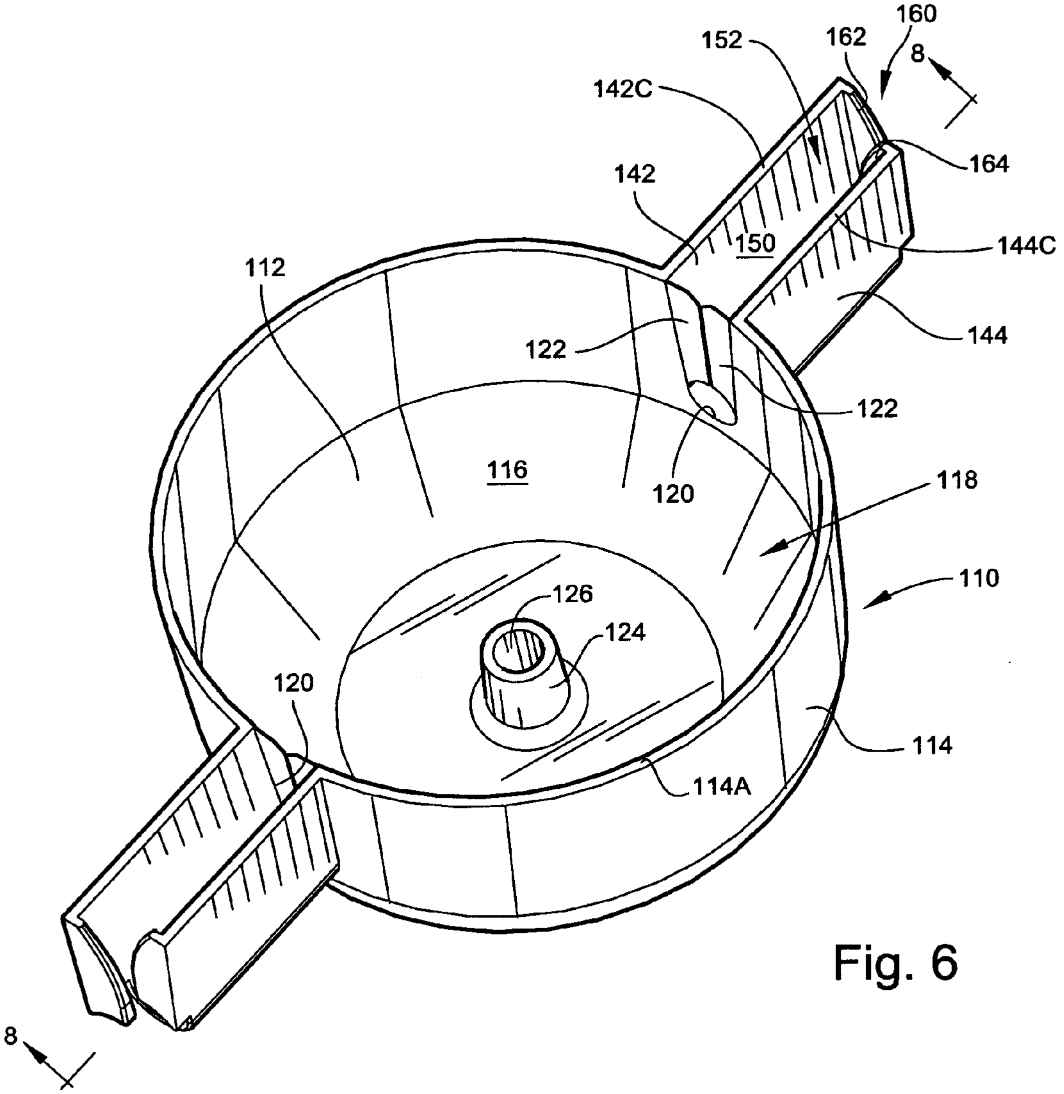
FIG. 6 is a bottom perspective view of the protective cover of FIG. 3.
Figure 8:
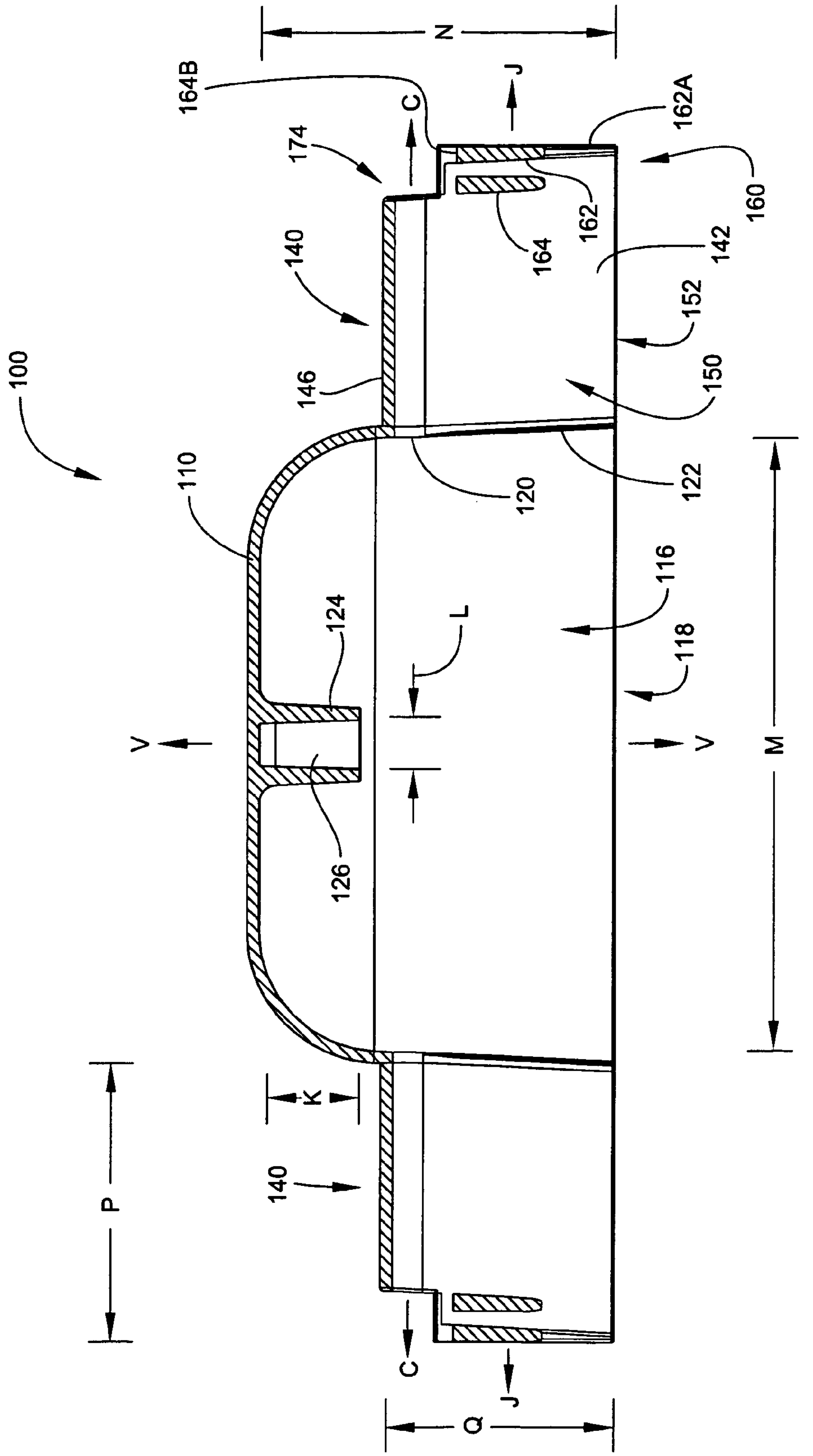
FIG. 8 is a cross-sectional view of the protective cover of FIG. 3 taken along the line 8-8 of FIG. 6.

As best seen in FIG. 6, the main body 110 includes a top wall 112 and a surrounding sidewall 114 that together define a cavity 116 that extends along a vertical axis V-V (FIGS. 5 and 8). The lower edge 114A of the sidewall 114 defines a lower opening 118 that communicates with the cavity 116. Side slots 120 are defined in the sidewall 114 at the arms 140 and communicate with the cavity 116 as well. Relatively thin, bendable walls 122 extend across the slots 120. A boss 124 projects from the top wall 112 into the cavity 116. A downwardly opening bore 126 is defined in the boss 124.

Figure 7:
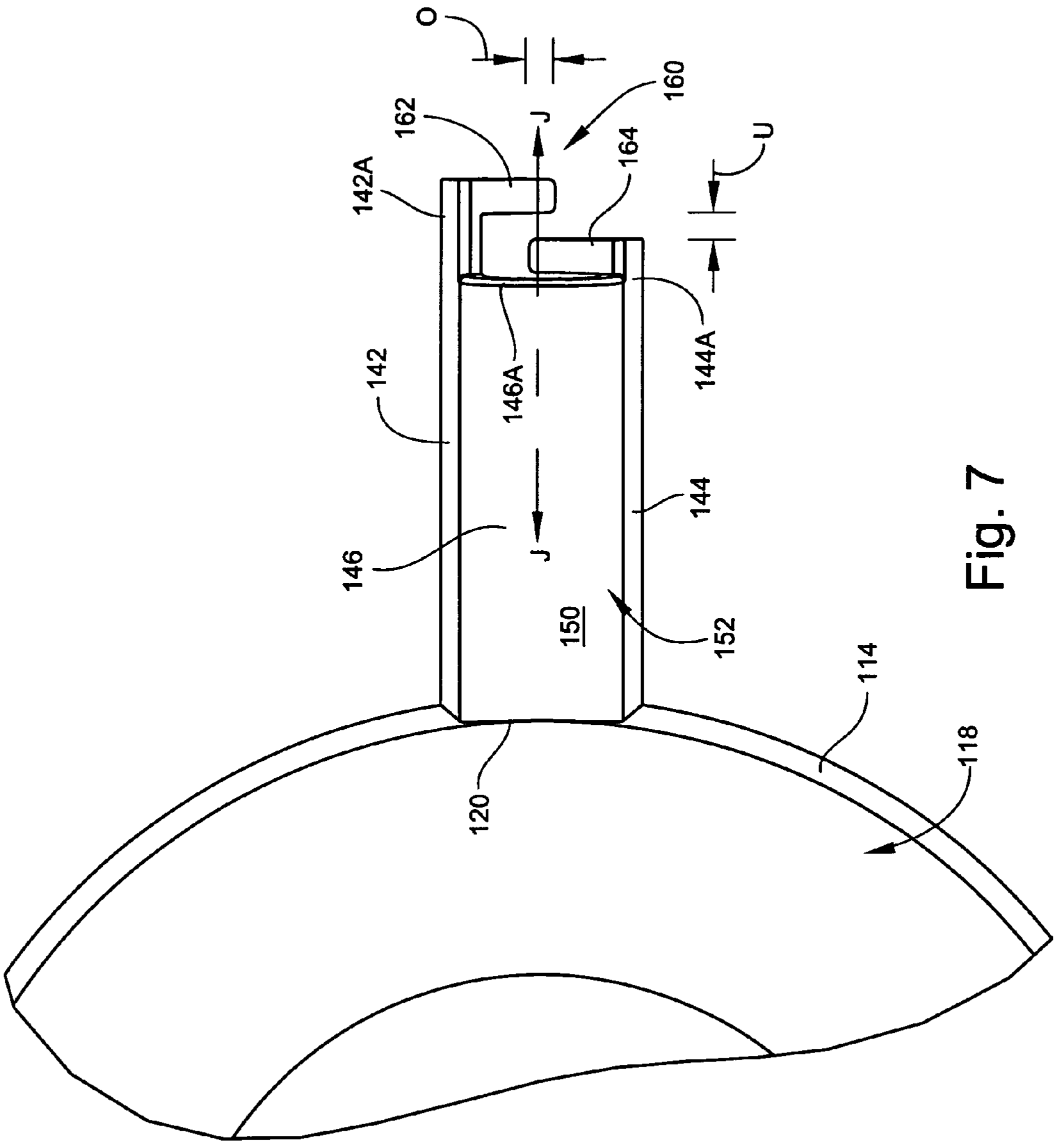
FIG. 7 is a fragmentary, bottom plan view of the protective cover of FIG. 3.

In this embodiment, the arms 140 are mirror images of one another and therefore only one of the arms 140 will be described in detail, it being understood that such description applies likewise to the other arm 140. The arm 140 has a pair of opposed, spaced apart sidewalls 142, 144 adjoining and extending laterally outwardly from the main body 110 along the lengthwise axis C-C (which is transverse to the vertical axis V-V) to respective wall ends 142A, 144A (FIG. 7). An arcuate connecting wall 146 extends along the lengthwise axis C-C and connects the top edges of the sidewalls 142, 144. The sidewalls 142, 144 and the connecting wall 146 together define a generally U-shaped channel 150 having a lengthwise bottom opening 152 (defined by the lower edges 142C, 144C (FIG. 6) of the sidewalls 142, 144) and an end opening 156. The channel 150 includes a conductor channel portion in the top of the channel 150 adjacent the connecting wall 146.

An attachment structure 160 is located on the outer end of the arm 140. The attachment structure 160 includes an inner wall or jaw 162 joined to the end 142A of the sidewall 142. The attachment structure 160 further includes an outer wall or jaw 164 joined to the end 144A of the sidewall 144. The jaws 162, 164 have respective convex inner edges 162A, 164A and respective concave latching edges 162B, 164B. When the attachment structure 160 is in a closed position as shown in FIGS. 1-3 and 5-7, the lower portions of the inner edges 162A, 164A collectively define a guide slot 170 (FIG. 5). The latch edges 162B, 164B and the walls 142, 144, 146 collectively define a conductor slot 174 on the lengthwise axis C-C and contiguous with the conductor channel 150.

According to some embodiments and as shown, a notch 172 is formed in at least the connecting wall 146 above the jaws 162, 164.

As best seen in FIGS. 2 and 7, the jaws 162, 164 are staggered or located at different positions along a jaw axis J-J that is generally parallel with the lengthwise axis C-C. Additionally, the jaws 162, 164 overlap across the axis J-J. As will be appreciated from the disclosure herein, this configuration may provide a secure engagement with the conductor 20 and allow for savings in manufacture of the cover 100. According to some embodiments and as shown, the jaws 162, 164 extend generally perpendicularly with respect to the axis J-J and the side walls 142, 144. According to some embodiments, the overlap distance O (FIG. 7) is at least 0.06 inch. According to some embodiments, the overlap distance O is at least 0.15 inch. According to some embodiments, the overlap distance is between about 0.15 and 0.375 inch. According to some embodiments and as shown, the jaws 162, 164 are spaced apart along the jaw axis J-J, which may facilitate manufacture. According to some embodiments, the jaws 162, 164 are spaced apart along the axis J-J a distance U (FIG. 7) of no more than the diameter of the intended conductor 20.

The cover 100 may be formed of any suitable material. According to some embodiments, the cover 100 is formed of a flexible polymeric material. According to some embodiments, the cover 100 is formed of a track resistant, insulating grade, UV stable polymer. The main body 110, the arms 140 and the attachment structures 160 may be formed of the same or different materials. Preferably, the jaws 162, 164 are formed of a rigid or semi-rigid material. According to some embodiments, the material of the jaws 162, 164 has a secant modulus of at least 25,000 psi. According to some embodiments, the material of at least the arms 140 has a tensile strength of from about 1200 to 2500 psi. According to some embodiments, the attachment structures 160 are unitarily and integrally formed with the walls 142, 144, 146. According to some embodiments, the main body 110, the arms 140 and the attachment structures 160 are unitarily and integrally formed. According to some embodiments, the cover 100 is unitarily molded. According to some embodiments, the cover 100 is unitarily injection molded.

The cover 100 may be mounted on the arrestor 50 and the conductor 20 in the following manner. The conductor 20 is first installed on the arrestor 50 in conventional or other suitable manner as shown in FIG. 2. The cover 100 is then forced downwardly onto the conductor 20 and the arrestor 50 such that a portion of the arrestor 50 is received through the opening 118 and into the cavity 116 and portions of the conductor 20 are received through the openings 152 and into the channels 150 of the arms 140.

More particularly, and with reference to one of the arms 140 (it being understood that the other arm 140 operates in the same manner), the cover 100 is forced in a downward direction I as shown in FIG. 4 and such that the conductor 20 is guided by the guide slot 170. As the cover 100 and jaws 162, 164 are lowered onto the conductor 20, the conductor 20 slides along the jaw inner edges 162A, 164A and relatively displaces the jaws 162, 164, causing them to deflect and separate in divergent directions D to an open position as shown in FIG. 4. Such deflection may be accommodated by flexure of the sidewalls 142, 144, the connecting wall 146 and/or the jaws 162, 164. According to some embodiments, the jaws 162, 164 themselves do not flex or only flex minimally. The cover 100 is further forced down onto the conductor 20 until the conductor 20 seats in the conductor slot 174, whereupon the jaws 162, 164 recover or return in convergent directions R toward the closed position of FIG. 5. According to some embodiments, the attachment structure 160 is adapted to recover or snap back substantially completely to the closed position of FIGS. 2, 6 and 7.

When the jaws 162, 164 return toward or to the closed position, portions of the latch edges 162B, 164B locate below the conductor 20 (i.e., between the conductor 20 and the channel opening 152) so that the conductor 20 is mechanically secured or interlocked in the channel 150. According to some embodiments, the sidewalls 142, 144, the connecting wall 146 and the latch edges 162B, 164B surround the circumference of the conductor 20 by at least 360 degrees. According to some embodiments, the jaw inner edges 162A, 164A at least partially overlap and the sidewalls 142, 144, the connecting wall 146 and the latch edges 162B, 164B surround the circumference of the conductor 20 by greater than about 360 degrees, and according to some embodiments by greater than about 400 degrees.

As the cover 100 is placed onto the surge arrestor 50 and the conductor 20 as described above, the stud 54 is received in the bore 126. According to some embodiments, the bore 126 is sized and configured to provide an interference fit between the stud 54 and the interior of the boss 124 so that the boss 124 grips the stud 54. The engagement between the stud 54 and the boss 124 may serve to restrict rotation of the cover 100 about the conductor 20 and to resist removal of the cover 100 from the arrestor 50.

The cover 100 can be installed on a "hot" or powered line using gloves or the like. The cover 100 may be modified to allow installation with a hot stick. In accordance with some embodiments, the attachment structure 160 automatically springs back to the closed or locked position once the conductor 20 is in place, thereby reducing the degree and complexity of manipulation needed to complete the installation. Removal may be accomplished by forcing the jaws 162, 164 apart (e.g., by hand or using a tool) and lifting the cover 100 off of the conductor 20.

Notably, the cavity 116 and the channels 150 both open from the same receiving side (i.e., the bottom side) of the cover 100 so that the cover 100 can be mounted on the arrestor 50 and the conductor 20 without requiring disconnection of the conductor 20 from the arrestor 50. Likewise, the configuration of the cover may allow for removal of the cover 100 from the arrestor 50 and the conductor 20 without requiring disconnection of the conductor 20 from the arrestor 50.

In addition to providing for convenient and positive attachment of the cover 100 to the conductor 20, the configuration of the attachment structures 160 may allow for improved flexibility, efficiency and/or cost-effectiveness in manufacture. The lengthwise-staggered, overlapping jaws 162, 164 do not require the formation of an undercut that may require special provision in the molding of the cover 100. In the cover 100 as illustrated, such an undercut is avoided by providing the notch 172 above the jaws 162, 164. The notch 172 may also serve to reduce the force required to open the jaws 162, 164 to permit insertion of the conductor 20.

The cover 100 may be adapted for use with a prescribed range of conductor sizes. According to some embodiments, for any conductor within the prescribed range of sizes, an insertion force of no more than 20 lbs. and of no less than 1 lbs. is required to install each attachment structure 160 onto the conductor.

The cover 100 can likewise be sized and configured to fit over a range of surge arrestor sizes. According to some embodiments, the cover 100 provides a minimum or nominal air gap between the electrically conductive portions of the arrestor 50 and the lower edge 114A of the main body 110 of at least ¼ inch. According to some embodiments, and as shown, the cover 100 is configured such that the sidewall 114 fits around and over the first (i.e., uppermost) skirt 52B of the arrestor 50. According to some embodiments, the diameter M of the cavity 116 is between about 4.75 and 5 inches. According to some embodiments, the depth K (FIG. 8) of the bore 126 is between about 0.75 and 1 inch. According to some embodiments, the nominal diameter L (FIG. 8) of the bore 126 is between about 95 and 100% of the diameter of the portion of the stud 54 received therein. According to some embodiments, the depth N (FIG. 8) of the cavity 116 is between about 2.75 and 3.5 inches. According to some embodiments, the length P (FIG. 8) of each arm 140 to the outer end of the shortest of the walls 142, 144, 146 is at least 2 inches. According to some embodiments, the depth Q (FIG. 8) of each conductor channel 150 is at least 1.75 inches.

The arrestor 50 and the cover 100 may be provided as a matched combination or kit 51 (FIG. 3). The kit 51 may be installed as described above.

While the cover 100 has been described as mounted on a surge arrestor 50, the cover 100 or covers otherwise formed in accordance with the present invention may be used with other types of devices. For example, the body of the cover 100 may be differently shaped. The arms 140 may be omitted and the attachment structures 160 formed directly on the main body 110. The arms 140 may be relatively positioned at different locations about the main body 110. More or fewer arms 140 may be provided.

The cover 100 may be mounted on a different type of insulated component than a surge arrestor. For example, the cover 100 may be mounted on a simple insulator. Covers in accordance with the present invention may be mounted on a conductor without also covering an insulator or the like. For example, the cover may be configured to cover only a length of conductor and incorporate one or more attachment structures such as the attachment structures 160 to secure the cover to the length of conductor.

Figure 9:
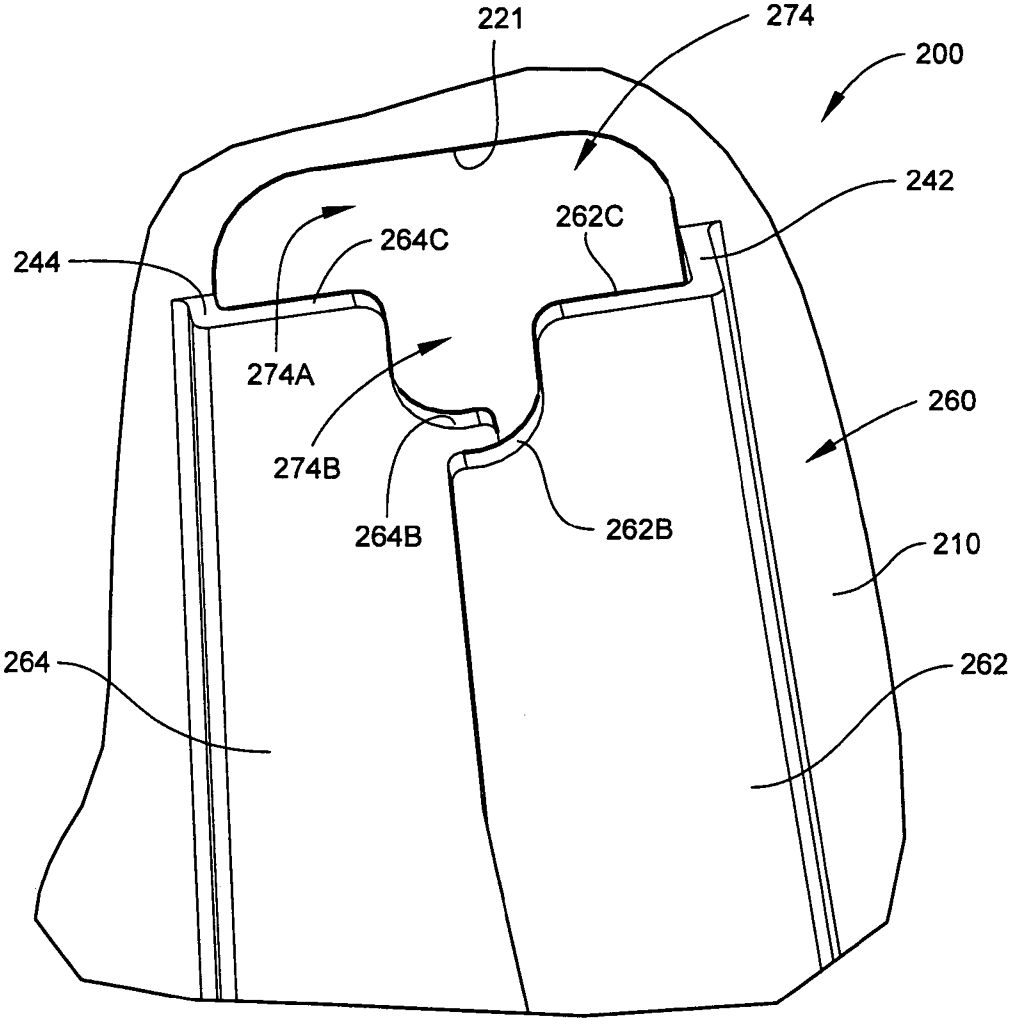
FIG. 9 is a fragmentary, enlarged view of a cover according to further embodiments of the present invention.

With reference to FIG. 9, a protective cover 200 according to further embodiments of the present invention is shown therein. The cover 200 may be formed and used in the same manner as described above for the protective cover 100, except as follows. The cover 200 is provided with an attachment structure 260 in place of the attachment structure 160, and the attachment structure 260 is formed closely adjacent the main body 210 with relatively short sidewalls 242, 244, and no wall corresponding to the connecting wall 146. The attachment structure 260 includes jaws 262, 264 generally corresponding to the jaws 162, 164 except that the latch edges of the jaws 262, 264 have first latch edge portions 262A, 264A and second latch edge portions 262B, 264B. The latch edge portions 262A, 262B, 264A, 264B and the opening 221 in the body 210 collectively define a T-shaped conductor slot 274.

The T-shaped conductor slot 274 has a narrow lower slot portion 274B and a relatively wider upper slot portion 274A. The T-shaped conductor slot 274 can serve accommodate conductors at various offset positions relative to the cover 200. For example, the conductor may be mounted at one of several centered or offset positions relative to the insulator body on which the cover 200 is mounted. The T-shaped conductor slot 274 may accommodate each of these positions by permitting the conductor to pass through the lower slot portion 274B or the left, right or center portions of the upper slot portion 274A. Thus, the T-shaped conductor slot 274 may accommodate both lateral and heightwise offset of the conductor.

Figure 10:
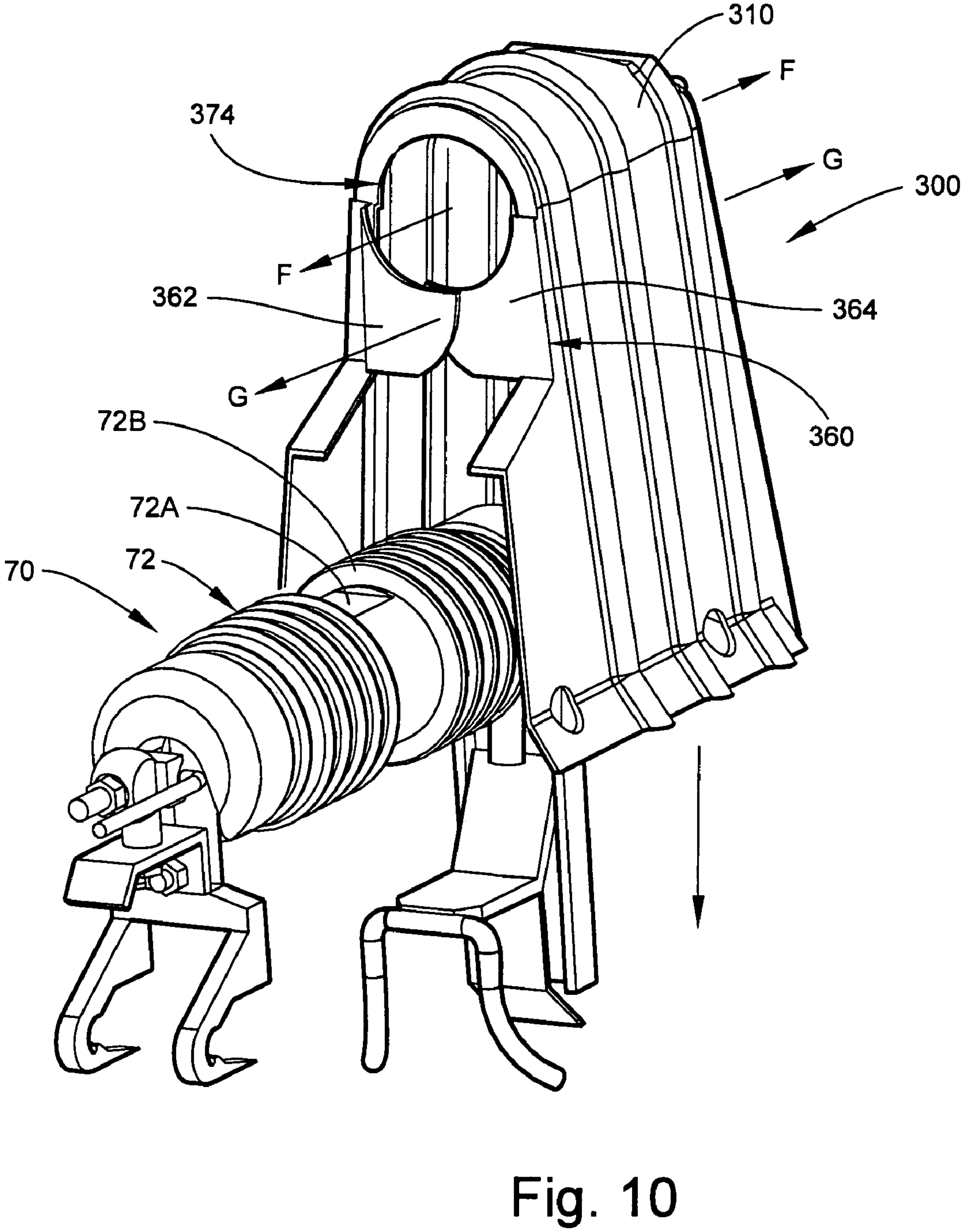
FIG. 10 is an exploded, perspective view of a distribution system assembly including an insulator body and a protective cover according to further embodiments of the present invention.
Figure 11:
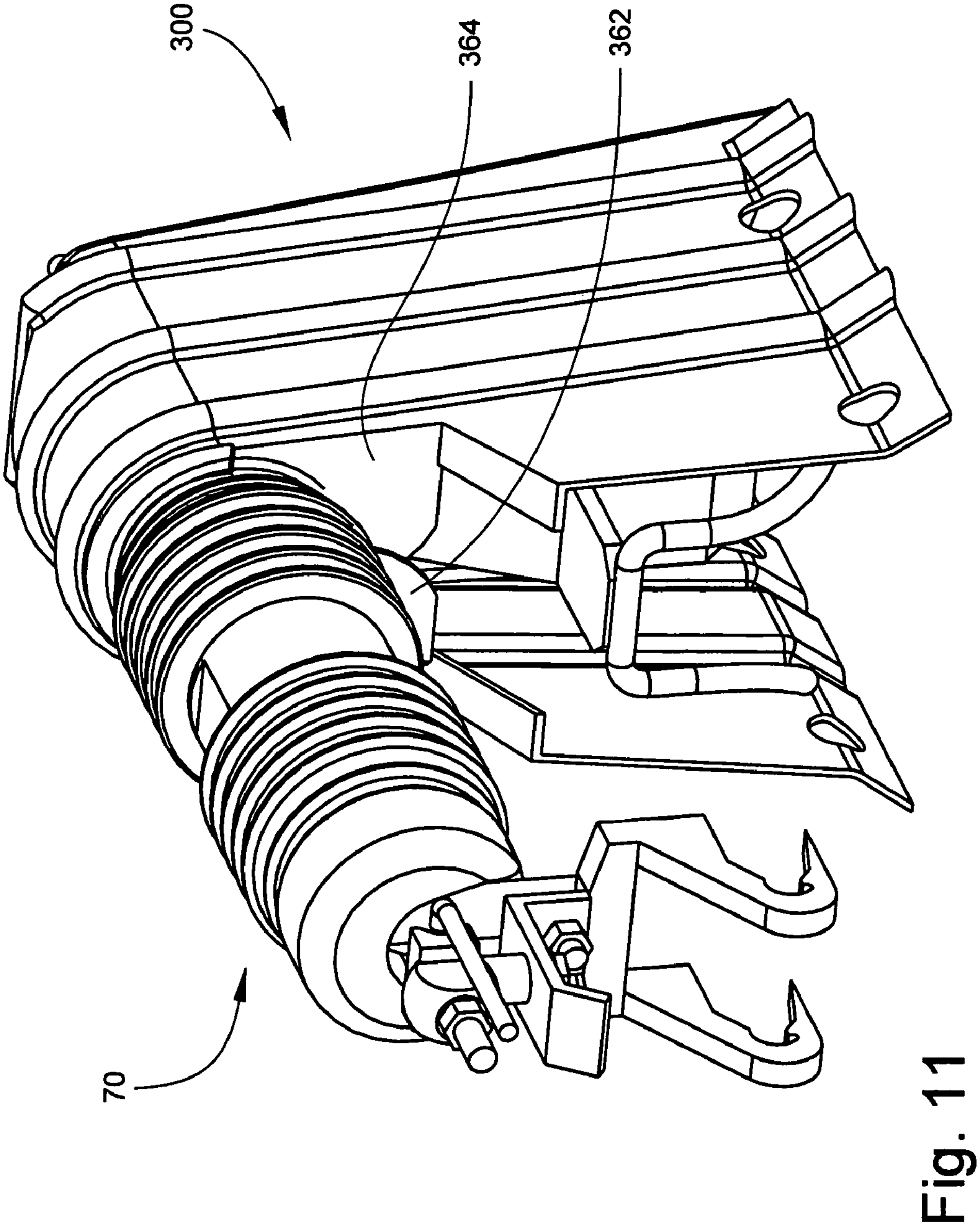
FIG. 11 is a perspective view of the distribution system assembly and the protective cover of FIG. 10 wherein the protective cover is mounted on the insulator body.

With reference to FIGS. 10 and 11, a protective cover 300 according to further embodiments of the present invention is shown therein. The protective cover 300 may be mounted on an insulator body 72 of an insulated component 70 (e.g., a surge arrestor, an insulator, a bushing, etc.). The protective cover 300 includes a cover body 310 and an attachment structure 360. The attachment structure 360 includes jaws 362, 364 that are staggered along and overlap across a jaw axis G-G, which is generally parallel to a lengthwise axis F-F. The lengthwise axis F-F extends through an opening 374 defined by the body 310 and the jaws 362, 364. The cover 300 can be mounted on the insulator 70 by forcing the cover 300 downwardly onto the insulator 70 between skirts 72B, thereby radially outwardly displacing or deflecting the jaws 362, 364 until the core section 72A is received in the slot 374, whereupon the jaws 362, 364 return to a closed or locked position. When the cover 300 is mounted on the insulator 70 as shown in FIG. 10, the axis F-F may correspond generally to the lengthwise center axis of the insulator 70. The slot 374 is sized and configured to fit about the core section 72A and between the adjacent skirts 72B to secure the cover 300 on the insulator as shown in FIG. 10. According to some embodiments, the attachment structure 360 is unitarily formed with the body 310. According to some embodiments, the entirety of the cover 300 is unitarily formed. The cover 300 may be formed of the same materials and using the same manufacturing techniques as described above with regard to the cover 100.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A cover for a distribution line conductor, the cover comprising:

a) a cover body defining a channel extending along a lengthwise axis and adapted to receive the conductor; and b) a unitarily formed attachment structure adjoining the cover body, the attachment structure including first and second jaws positioned adjacent the channel, wherein the first and second jaws are positioned at different locations along a jaw axis parallel to the lengthwise axis and, in a closed position, overlap one another across the jaw axis;

c) wherein the first and second jaws are relatively deflectable from the closed position to an open position to permit passage of the conductor therebetween and into the channel and the first and second jaws can thereafter return toward the closed position to secure the conductor in the channel.

2. The cover of claim 1 wherein the attachment structure is unitarily formed with the cover body.

3. The cover of claim 1 wherein the attachment structure is formed of a resilient material, the first and second jaws are biased toward the closed position when in the open position, and, when the first and second jaws are in the open position and the conductor is positioned in the channel, the first and second walls can thereafter passively recover toward the closed position.

4. The cover of claim 1 wherein the first and second jaws are adapted to recover toward the closed position to secure the conductor in the channel such that the first and second jaws overlap one another across the jaw axis with the conductor disposed in the channel.

5. The cover of claim 1 wherein the cover body and the first and second jaws are adapted to collectively surround a circumference of the conductor by at least 360 degrees.

6. The cover of claim 1, wherein:

the cover body includes a main body portion and a lateral body extension;

the main body portion defines a chamber to receive an insulator body, the lateral body extension defines the channel to receive the conductor, and the main body portion and the lateral body extension each open to a receiving side of the cover; and a stud bore is defined in the main body portion and is sized and configured to receive and engage a stud to provide an interference fit with the stud.

7. The cover of claim 6 wherein the cover is unitarily formed.

8. The cover of claim 6 wherein the main body portion includes a boss extending into the chamber, wherein the stud bore is defined in the boss.

9. A cover for an electrical device and a distribution line conductor coupled thereto, the electrical device including an insulator body and a stud extending from the insulator body, the cover comprising a cover body including a main body portion and a lateral body extension, wherein:

the main body portion defines a chamber to receive the insulator body, the lateral body extension defines a channel to receive the conductor, and the main body portion and the lateral body extension each open to a receiving side of the cover; and a stud bore is defined in the main body portion and is adapted to receive and engage the stud to secure the cover to the electrical device; and an attachment structure adapted to secure the conductor within the channel;

wherein:

the channel extends along a lengthwise axis;

the attachment structure includes first and second jaws positioned adjacent the channel, wherein the first and second jaws are positioned at different locations along a jaw axis parallel to the lengthwise axis and, in a closed position, overlap one another across the jaw axis; and the first and second jaws are relatively deflectable from the closed position to an open position to permit passage of the conductor therebetween and into the channel and the first and second jaws can thereafter return toward the closed position to secure the conductor in the channel.

10. The cover of claim 9 wherein the attachment structure is unitarily formed.

11. The cover of claim 10 wherein the attachment structure is unitarily formed with the cover body.

12. The cover of claim 10 wherein the attachment structure is formed of a resilient material, the first and second jaws are biased toward the closed position when in the open position, and, when the first and second jaws are in the open position and the conductor is positioned in the channel, the first and second walls can thereafter passively recover toward the closed position.

13. The cover of claim 9 wherein the first and second jaws are adapted to recover toward the closed position to secure the conductor in the channel such that the first and second jaws overlap one another across the jaw axis with the conductor disposed in the channel.

14. The cover of claim 9 wherein the cover body and the first and second jaws are adapted to collectively surround a circumference of the conductor by at least 360 degrees.

15. A surge arrestor assembly for use with a distribution line conductor, the surge arrestor assembly comprising:

a) a surge arrestor adapted to operatively couple with the conductor and to redirect electrical current from the conductor in the event of an overvoltage event; and b) a cover adapted to be mounted on the surge arrestor, the cover including a cover body including a main body portion and a lateral body extension, wherein the main body portion defines a chamber to receive the surge arrestor, the lateral body extension defines a channel to receive the conductor, and the main body portion and the lateral body extension each open to a receiving side of the cover; and c) an attachment structure adapted to secure the conductor within the channel;

d) wherein:

the channel extends along a lengthwise axis;

the attachment structure includes first and second jaws positioned adjacent the channel, wherein the first and second jaws are positioned at different locations along a jaw axis parallel to the lengthwise axis and, in a closed position, overlap one another across the jaw axis; and the first and second jaws are relatively deflectable from the closed position to an open position to permit passage of the conductor therebetween and into the channel and the first and second jaws can thereafter return toward the closed position to secure the conductor in the channel.

16. The surge arrestor assembly of claim 15 wherein the surge arrestor includes an upstanding stud and the cover includes a stud bore in the main body portion, wherein the stud bore receives and engages the stud to provide an interference fit with the stud, wherein the interference fit secures the cover to the surge arrestor.

17. The surge arrestor assembly of claim 16 wherein the main body portion includes a boss extending into the chamber, wherein the stud bore is defined in the boss.

18. The surge arrestor assembly of claim 15 wherein the cover is unitarily formed.

19. The surge arrestor assembly of claim 15 wherein the attachment structure is unitarily formed.

20. The surge arrestor assembly of claim 19 wherein the attachment structure is unitarily formed with the cover body.

21. The surge arrestor assembly of claim 19 wherein the attachment structure is formed of a resilient material, the first and second jaws are biased toward the closed position when in the open position, and, when the first and second jaws are in the open position and the conductor is positioned in the channel, the first and second walls can thereafter passively recover toward the closed position.

22. The surge arrestor assembly of claim 15 wherein the first and second jaws are adapted to recover toward the closed position to secure the conductor in the channel such that the first and second jaws overlap one another across the jaw axis with the conductor disposed in the channel.

23. The surge arrestor assembly of claim 15 wherein the cover body and the first and second jaws are adapted to collectively surround a circumference of the conductor by at least 360 degrees.

24. A cover for use with an insulator body, the cover comprising:

a) a cover body defining a channel extending along a lengthwise axis and adapted to receive the insulator body; and b) a unitarily formed attachment structure adjoining the cover body, the attachment structure including first and second jaws positioned adjacent the channel, wherein the first and second jaws are positioned at different locations along a jaw axis parallel to the lengthwise axis and, in a closed position, overlap one another across the jaw axis;

c) wherein the first and second jaws are relatively deflectable from the closed position to an open position to permit passage of the insulator body therebetween and into the channel and the first and second jaws can thereafter return toward the closed position to secure the insulator body in the channel.

25. The cover of claim 24 wherein the attachment structure is unitarily formed with the cover body.

26. The cover of claim 24 wherein the first and second jaw portions are adapted to receive a core portion of the insulator body, when in the open position, and to fit between a pair of skirts located on opposed sides of the core portion along a length of the insulator body to restrict movement of the cover along the length of the insulator body.

* * * * *